United States Patent [19]
Medina

[11] Patent Number: 5,400,545
[45] Date of Patent: Mar. 28, 1995

[54] METHOD FOR CONTROLLING THE DELIVERY OF LIQUIDS TO A PLANT

[76] Inventor: Abraham B. Medina, 621 Cheyney Rd., Springfield, Pa. 19064

[21] Appl. No.: 146,428

[22] Filed: Oct. 29, 1993

Related U.S. Application Data

[63] Continuation of Ser. No. 923,485, Aug. 3, 1992, abandoned.

[51] Int. Cl.⁶ .............................................. A01G 9/02
[52] U.S. Cl. .............................................. 47/84; 47/66; 47/30
[58] Field of Search ............... 47/30 OT, 45, 25 RS, 47/79, 66, 84 C

[56] References Cited

U.S. PATENT DOCUMENTS

| | | | |
|---|---|---|---|
| 109,098 | 11/1870 | Adams | 47/25 RS |
| 471,573 | 3/1892 | Rowell | 47/30 OT |
| 2,017,308 | 10/1935 | Elmer | 47/84 C |
| 3,868,787 | 3/1975 | Wong, Jr. | 47/45 |
| 4,299,055 | 11/1981 | Dziewulski et al. | 47/66 |
| 4,315,382 | 2/1982 | Kay et al. | 47/66 |
| 4,317,311 | 3/1982 | Schmitt | 47/66 |
| 4,739,581 | 4/1988 | Jarvis | 47/66 |
| 4,813,177 | 3/1989 | Brilliande | 47/66 |

FOREIGN PATENT DOCUMENTS

| | | | |
|---|---|---|---|
| 197596 | 3/1920 | Canada | 47/30 OT |
| 367247 | 10/1906 | France | 47/79 |
| 234732 | 2/1945 | Switzerland | 47/30 OT |
| 2216377 | 10/1989 | United Kingdom | 47/30 OT |

*Primary Examiner*—Ramon S. Britts
*Assistant Examiner*—Joanne C. Downs
*Attorney, Agent, or Firm*—William Freedman

[57] ABSTRACT

Tubular structure, referred to herein as a plant funnel, surrounds a body of enclosed soil that, in turn, surrounds the base of a growing plant. This funnel, when inserted into garden soil, acts to confine about the base of the plant water and nutrients supplied from above to the body of enclosed soil. The funnel has an open and unobstructed bottom through which the body of enclosed soil can make contact with the garden soil and through which the base of the plant extends or can grow into the garden soil beneath the funnel. The funnel is made of a material that is substantially non-biodegradable.

1 Claim, 5 Drawing Sheets

METHOD FOR CONTROLLING THE DELIVERY OF LIQUIDS TO A PLANT

This is a continuation of application Ser. No. 07/923,485, filed on Aug. 3, 1992, now abandoned.

FIELD OF THE INVENTION

This invention relates to a means for controlling the delivery of water and fertilizer supplied to a growing plant, and, more particularly relates to a device of this type that improves the efficiency of such delivery. The invention also relates to a method of displaying, planting, and cultivating such a plant.

BACKGROUND

In traditional gardening practice, plants are supplied with water and fertilizer by applying such additives to a relatively broad surface area of the soil surrounding the plants. For example, a sprinkler or a hose may be used to supply or spray water and/or a fertilizer solution onto the surrounding soil. This practice is quite wasteful since much of the water and the fertilizer solution will run off or otherwise disperse without reaching the roots of the plant or plants. Even if a jug or a watering can is used for supplying the water or fertilizer solution, much of the liquid will still run off or otherwise disperse without reaching the roots of the plant.

OBJECTS

An object of my invention is to improve the efficiency with which water and fertilizer are delivered to the root system of the plant.

Another object is to provide a device that improves such efficiency but yet does not significantly interfere with growth of the plant or its root system into the garden soil beneath the plant. Another object is to provide a method that employs the efficiency-improving device of the immediately-preceding object for displaying the plant outside the garden soil and for making possible a subsequent easy transfer of the plant to a location within the garden soil.

SUMMARY

In carrying out the invention in one form, I provide tubular structure, referred to hereinafter as a funnel, that surrounds a body of enclosed soil that surrounds the base of a plant. This funnel when inserted into garden soil located around and beneath the funnel acts to confine about the base of the plant water and nutrients supplied from above to the body of enclosed soil. The funnel has an open top through which the exposed portion of the plant can grow upwardly and an open and unobstructed bottom through which the body of enclosed soil can make contact with the garden soil and through which the base of the plant extends or can grow downwardly into the garden soil beneath the funnel. The funnel is made of material that is substantially non-biodegradable. In certain of the claims, the funnel is claimed in combination with the enclosed body of soil, the plant within the enclosed body, and the garden soil surrounding the funnel.

BRIEF DESCRIPTION OF FIGURES

For a better understanding of the invention, reference may be had to the following detailed description taken in connection with the accompanying drawings, wherein.

DETAILED DESCRIPTION OF EMBODIMENTS

Figure 1:
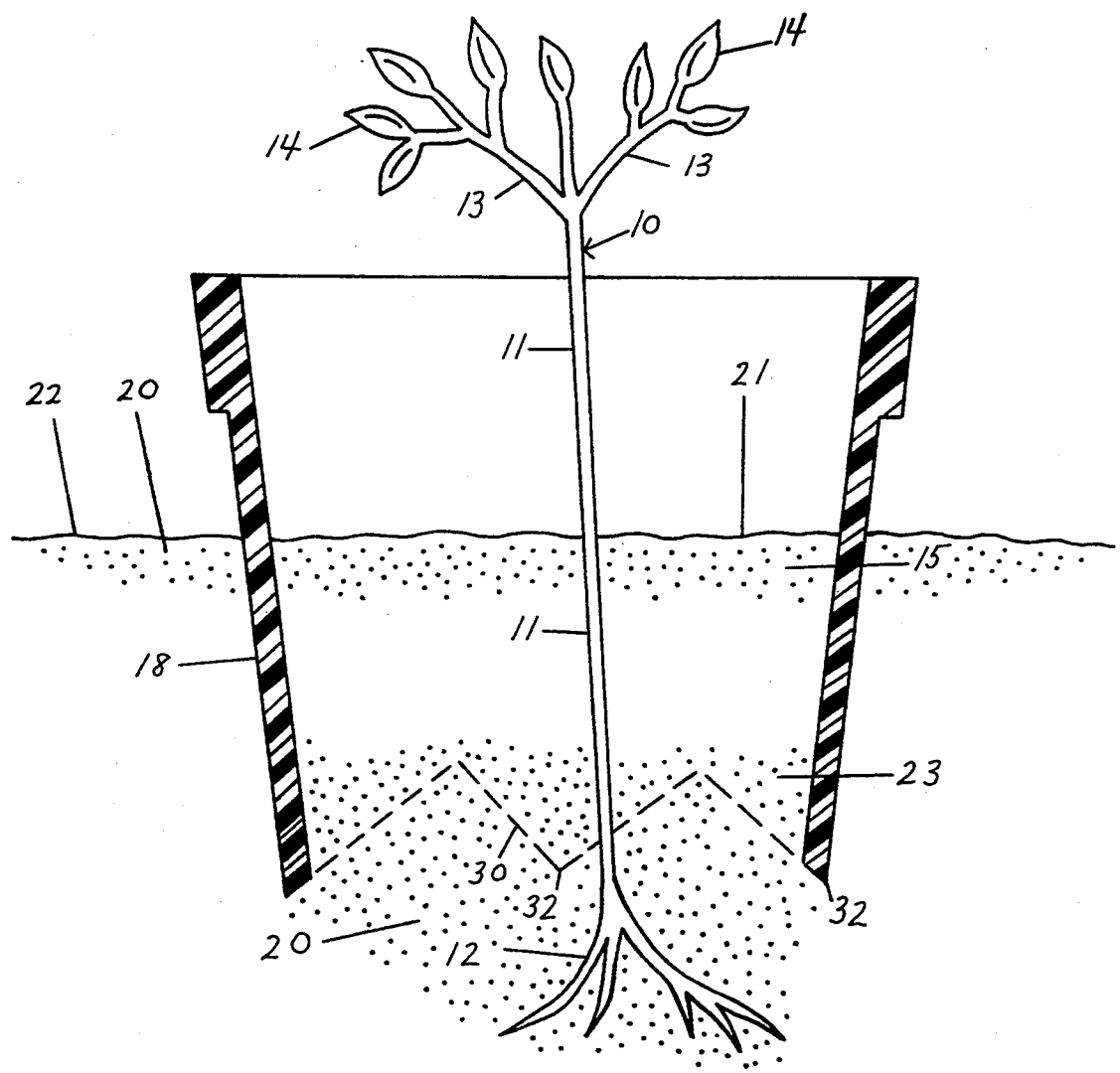
FIG. 1 is a side elevational view partially in section showing a plant funnel embodying one form of my invention and illustrated in an environment where the funnel can control the delivery of water and fertilizer to a plant.

Referring now to FIG. 1, there is shown a plant 10, for example, a tomato or other vegetable or an ornamental flower plant. This plant has a central stem 11, a root system 12 in its lower region, and in its upper region branches 13 with foliage 14 exposed to air and sunlight. The base of the plant 10 is surrounded by a body 15 of soil, which is enclosed by a tubular member 18, referred to herein as a funnel. The funnel 18 is made of material that is substantially non-biodegradable and substantially non-porous, e.g., a suitable plastic.

This funnel 18 is shown in a position that it occupies after having been inserted into the soil 20 of a garden. The funnel 18 extends upwardly for a short distance, for example, several inches, above the upper surface 21 of the enclosed body 15 of soil within the funnel. The funnel also extends upwardly for roughly this same distance above the surface 22 of the surrounding garden soil 20. The distance that the funnel should extend downwardly into the garden soil depends upon the size and type of plant enclosed. For many vegetable and flower varieties, the funnel size is selected so that this distance into the soil is about 2 to 5 inches. This latter distance figure is provided by way of example and not limitation.

Figure 3:
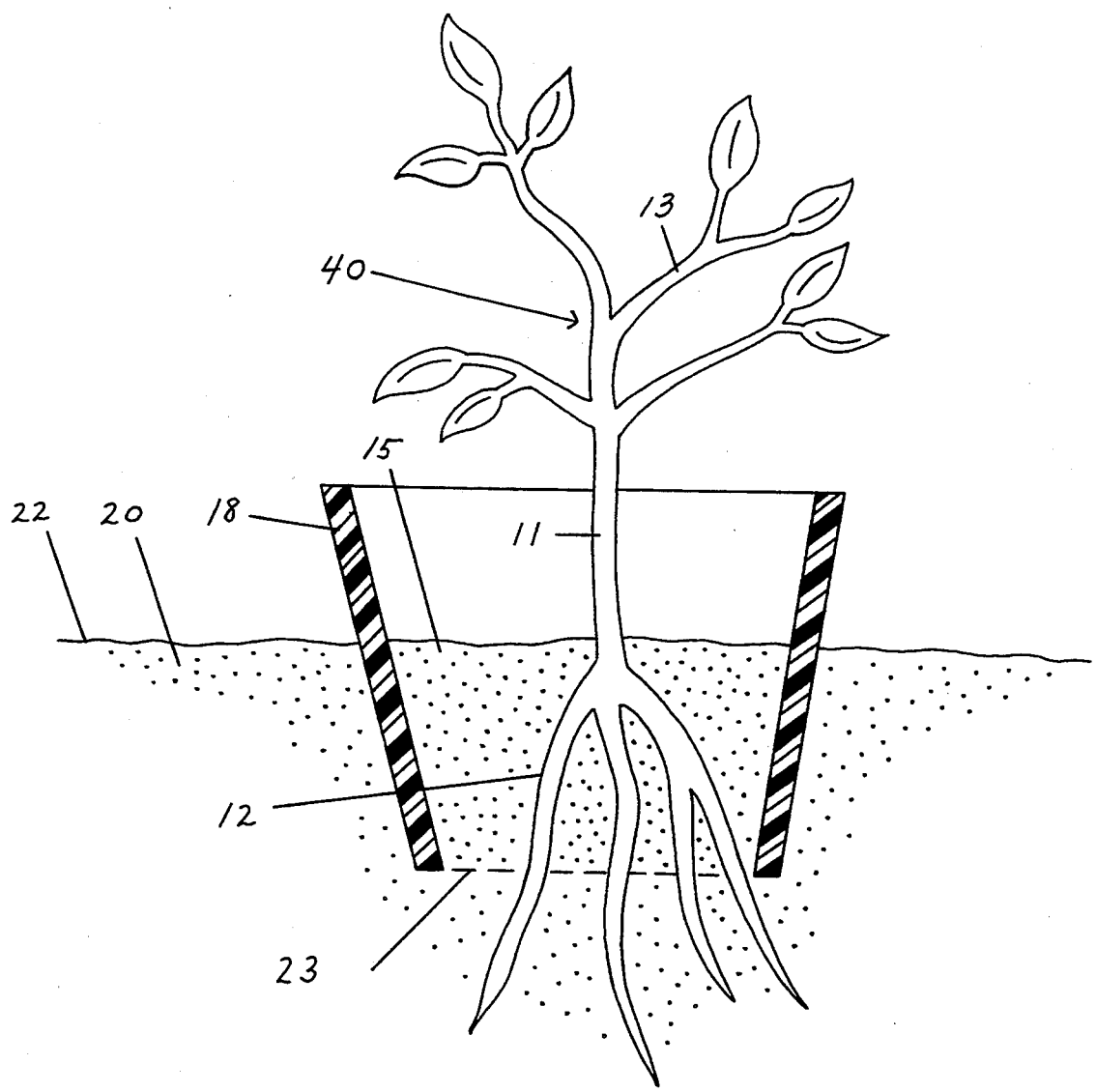
FIG. 3 shows the components of FIG. 2 after transplanting has been completed and the seedling of FIG. 2 has grown into a more mature plant.

A significant feature of the funnel 18 is that its bottom 23 is open and essentially unobstructed to allow the enclosed body 15 of soil to contact the garden soil 20 beneath the funnel and also to allow the base of the plant to extend freely therethrough into this garden soil 20 beneath the funnel. When liquid (in the form of water or a fertilizer solution) is supplied from above to the enclosed body 15 of soil within the funnel 18, the liquid is free to soak downwardly through the enclosed body and into the root system 12 of the plant. This root system may be located below the enclosed body 15 of soil, as shown in FIG. 1, or it may be located partially within the enclosed body 15 of soil and partially below it, as shown in FIG. 3 (soon to be described).

The tubular wall of funnel 18, being substantially non-porous, prevents liquid that is supplied from above to the body 15 of soil from flowing radially outwardly from the body 15 past the wall of the funnel. Only when such liquid has soaked downwardly through the body 15 of enclosed soil into the garden soil 20 beneath the funnel can a small portion, if any, of the liquid travel radially outward beyond the funnel wall. Most of the liquid that reaches the open bottom 23 of the funnel soaks downwardly into the soil 20 immediately adjacent the root system.

While liquid supplied to the plant will often temporarily collect above the surface 21 of the enclosed body 15 of soil, such liquid is prevented from running off onto the surrounding garden soil 20 by the portion of the upper end of the funnel that projects above the surface of the enclosed body 15. To assure that such water is retained until absorbed by the enclosed body 15, this projecting upper end defines a continuous closed wall of substantially imperforate construction surrounding the exposed stem portion of the plant.

It will be apparent from the above that the funnel 18 acts to conserve water and fertilizer that are supplied to the plant 10. This water and fertilizer, when supplied to the upper surface of the enclosed body 15 of soil, are largely confined to the region immediately around the plant and are usually not allowed to run off or otherwise travel into regions remote from the plant where they would be of little value to the plant.

Another advantage that results from using my funnel 18 is that since the garden soil 20 remote from the plant is not watered and fertilized by the feeding of the plant in the above described manner, the growth of weeds in this soil is not promoted by such feeding.

To facilitate insertion and anchoring of the funnel in the garden soil 20, the lower edge of the funnel in the embodiment of FIG. 1 is provided with downwardly-extending teeth 30 that have downwardly-directed points 32. When the bottom of the funnel is placed on the surface 22 of the garden soil 20 and pressure from above is applied to the funnel, the teeth 30 dig into the soil, thus facilitating insertion of the funnel into the soil and also anchoring of the funnel in the soil. The funnel can be twisted during insertion to assist the teeth in digging into the soil.

Figure 4:
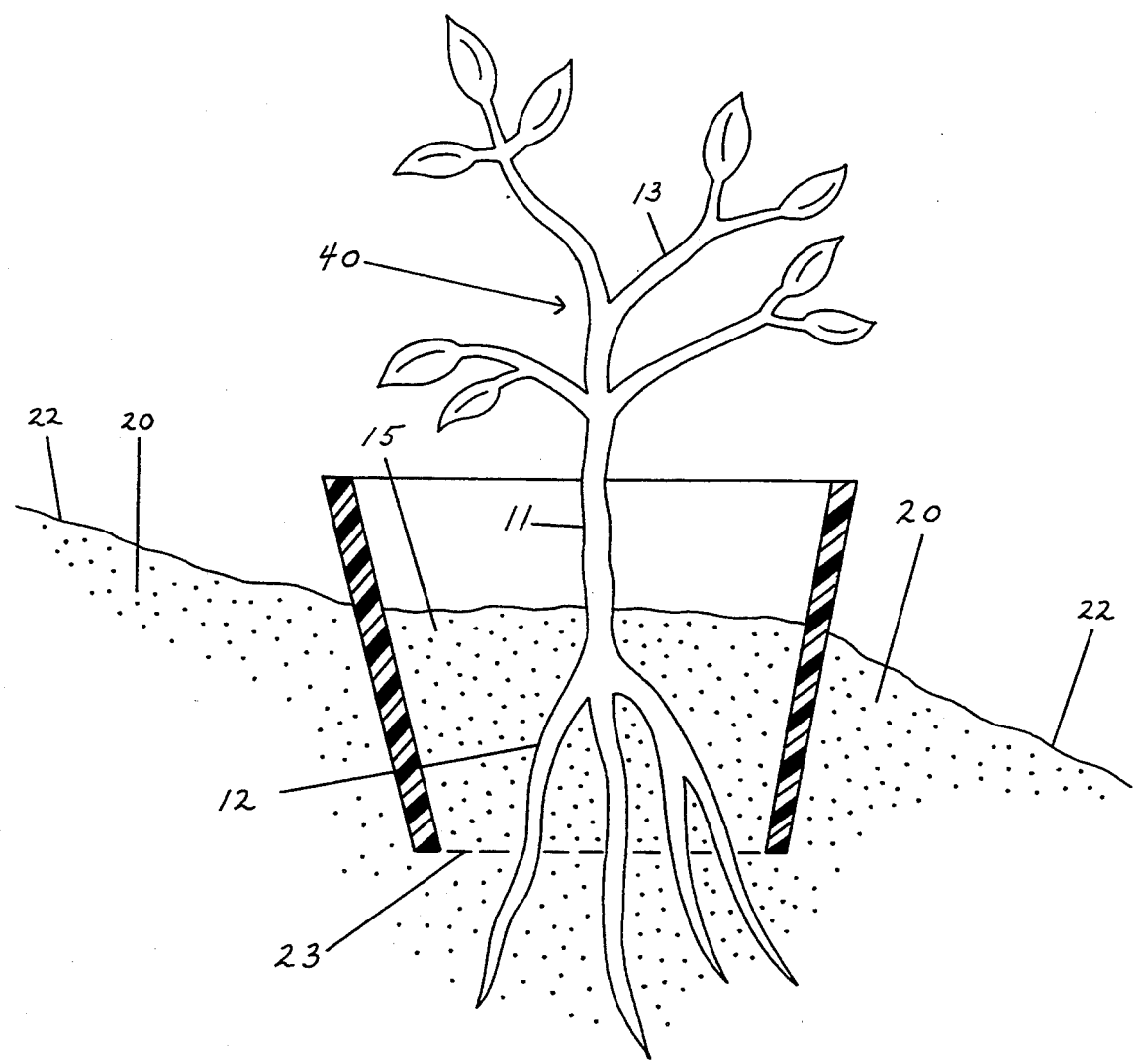
FIG. 4 is a view similar to FIG. 3 except showing use of the invention in sloping terrain.

My funnel is especially useful for growing plants on inclined, sloping, or uneven terrain, where liquids applied to the soil immediately around the plant tend to run off before they have an opportunity to soak into the soil immediately around the plant. Such an environment is illustrated in FIG. 4, where the garden soil 20 has a sloping surface 22. It will be apparent from this figure that water supplied to the body 15 of enclosed soil will be retained within the confines of the funnel 18 until it soaks downwardly through the body 15 and reaches the open bottom of the funnel. In the absence of the funnel 18, much of the water applied to the plant would run off down the sloping surface 22 before it could soak into the soil in the immediate region of the plant.

In dry or desert areas, the funnel can serve as a basic water-conservation tool by blocking the run-off of water supplied to the plant until it soaks downwardly into the enclosed body 15 of soil.

Figure 2:
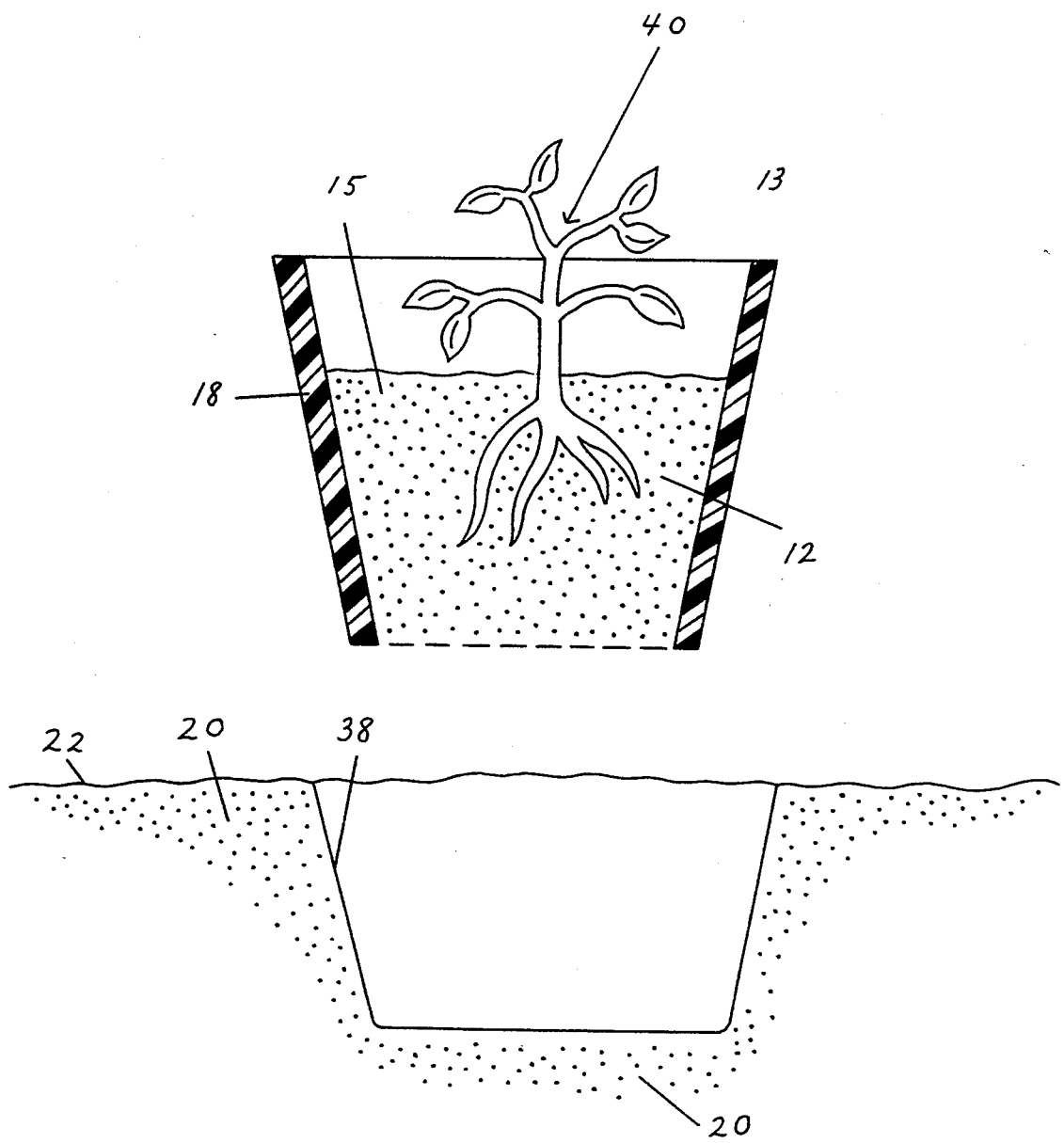
FIG. 2 is a sectional view illustrating the use of my plant funnel in transplanting a seedling into garden soil.

My funnel is also especially useful for the transplanting of seedlings into garden soil. Such transplanting is illustrated in FIG. 2, where a hole 38 has been dug in the garden soil 20 in preparation for receiving the funnel 18 and its contents. Within the funnel 18 is the enclosed body 15 of soil and a seedling 40 that is to be transplanted into the garden soil. The seedling includes a central stem 11, roots 12, and an exposed upper portion 13. In FIG. 2 the roots 12 are located within the enclosed body 15 of soil.

FIG. 3 shows the components of FIG. 2 after the funnel 18 and its contents have been inserted into the hole 38 in soil 20 and after the seedling has grown into a more mature plant. As shown in FIG. 3, the exposed portion 13 of the plant has grown upwardly through the open top of the funnel 18, and the roots of the plant have grown downwardly through the open bottom 23 of the funnel into the garden soil 20 beneath the funnel.

Comparing FIGS. 2 and 3, it will be noted that the funnel 18 and the body 15 of enclosed soil have remained in place around the plant base. Neither the plant 40 nor the soil body 15 were taken out of the funnel 18 or otherwise significantly disturbed during the transplanting process. This helps to alleviate or prevent physiological stress to the plant (manifested as wilting in most cases) which might otherwise have occurred as a result of the transplanting.

Figure 5:
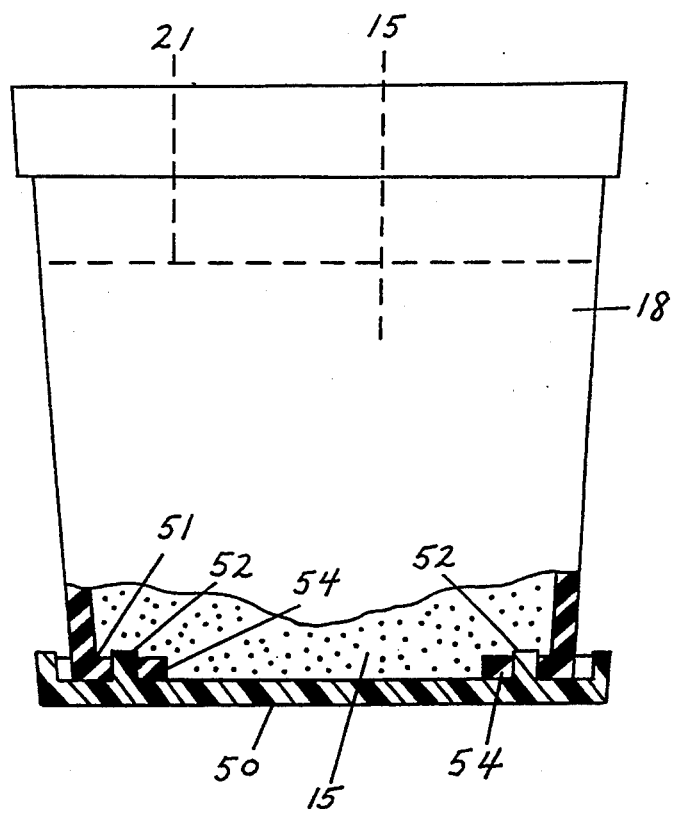
FIG. 5 is a side elevational view partly in section of a plant funnel combined with a detachable cover across its otherwise-open bottom.

FIG. 5 shows the funnel 18 with a detachable cover 50 covering its otherwise-open bottom. The cover 50 is held in place by suitable snap-on fastening means 51 such as suitable fingers 52 integral with the cover and extending upwardly from the body of the cover into holes within a narrow flange 54 at the bottom edge of the funnel. Using such a cover 50 and fastening means such as 51 allows the funnel 18 of FIG. 2, when located outside the garden soil 20, to be used as a conventional pot for plants such as the seedling 40 of FIG. 2. When a plant growing in such a pot is to be transplanted to a garden, the bottom cover 50 is detached and the remaining components are inserted into the garden soil, as shown, for example, in FIG. 2. The then-open condition of the bottom of the funnel allows the roots of the plant to grow downwardly into the garden soil and also allows the portion of the root system below the funnel to receive water and nutrients supplied from above to the body 15 of enclosed soil.

It is to be understood that the tubular funnel 18 may be of any suitable horizontal cross-section, for example, round, rectangular, or oval. Its horizontal cross-section may be of uniform size along the funnel length, or it may taper or otherwise vary from top to bottom as illustrated.

Figure 6:
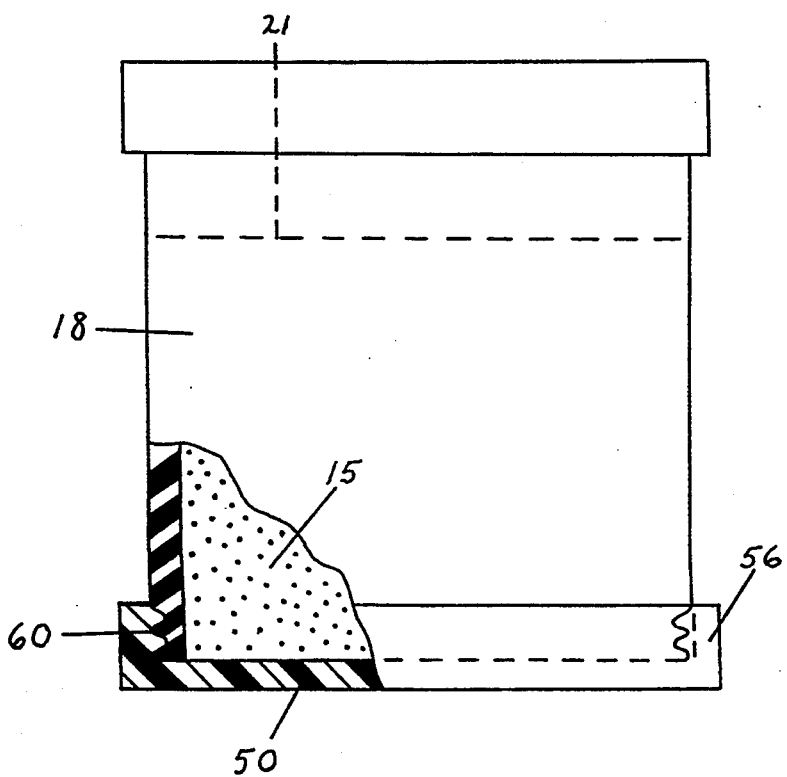
FIG. 6 shows a modified form of the FIG. 5 combination.

FIG. 6 shows a funnel 18 of uniform horizontal cross-section along its length that is fitted at its bottom with a cover 50 that is detachably connected to the funnel 18 by a screw-threaded joint 60. External threads on the funnel at its lower end mesh with internal threads on an annular flange 56 of the cover 50 in essentially the same way as in the conventional screw-threaded joint between a bottle cap and the top of a bottle that it caps. When the plant (not shown) within the body 15 of soil within the funnel is to be transplanted, the cover 50 is screwed off and the then-open lower end of the funnel is inserted into a hole prepared for it in the garden soil. It is to be understood that the serrated lower end of the funnel of FIG. 1 can be provided with a cover (such as 50) joined to the funnel in the same way as shown in FIG. 6, thereby allowing the combination to act as a pot when not positioned in the garden-soil.

The embodiments of FIGS. 5 and 6 allow transplanting to be easily effected without the need for extracting the plant from the soil 15 in which it had been growing. This can be an attractive sales promotion feature for a nursery or garden shop that is selling plants in the pots of FIGS. 5 and 6. The seller can inform its potential customer that transplanting can be easily effected without shock to the plant simply by detaching the readily-removable bottom cover (50) and then inserting the resulting funnel (18) with its contents still in place into the soil of his garden, after which he can receive the other benefits described hereinabove from the continued presence of the funnel.

Another way in which my funnel may be utilized, especially with small seedlings that have not yet grown to the top of the funnel, is by covering the top of the funnel with transparent plastic material, e.g., transparent plastic film, suitably held in place. This top cover is perforated with one or more small holes to allow for breathing. In effect, a miniature greenhouse is created within the funnel for the seedlings. This greenhouse can provide a modest degree of protection against cold for the seedling, thus allowing the seedling to be transplanted into an outdoor garden earlier than usual in the spring.

While I have shown and described particular embodiments of my invention, it will be obvious to those skilled in the art that various changes and modifications may be made without departing from the invention in its broader aspects; and I, therefore, intend herein to cover all such changes and modifications as fall within the true spirit and scope of my invention.

What I claim as new and desire to secure by Letters Patent of the United States is:

1. A method of displaying, planting, and cultivating a plant, comprising the following steps:
   (a) providing (i) a tubular plant funnel for insertion into garden soil, (ii) a plant having a base surrounded by said funnel, and (iii) a body of enclosed soil surrounding the plant base and surrounded by said funnel, said funnel having an open top through which the plant can grow upwardly and, absent the cover of paragraph (b) below, an open and unobstructed bottom through which the enclosed body of soil can make contact with said garden soil and said plant can grow downwardly into said garden soil, said funnel having a substantially imperforate upper portion of tubular form adjacent said open top and also a substantially imperforate lower portion extending from Said upper portion to near the bottom of said funnel,
   (b) providing a detachable cover for said open bottom,
   (c) employing for holding said cover in place fastening means that detachably connects said cover to said tubular plant funnel in a position in which the cover extends across said bottom, said fastening means being constructed to enable detachment of said cover from said funnel while said body of enclosed soil is present within said funnel,
   (d) displaying the plant while the plant and said body of enclosed soil are located in said plant funnel and said plant funnel is located outside said garden soil with said cover in place across said bottom,
   (e) detaching said cover while said body of enclosed soil is present within said funnel, thereby restoring said bottom to its open and unobstructed condition, and
   (f) inserting said funnel while said bottom is open and unobstructed and said plant and said body of enclosed soil are present within said funnel into a hole provided in said garden soil that results in said enclosed body of soil making contact with said garden soil, the funnel when inserted having its substantially imperforate upper portion projecting above the surface of the body of enclosed soil and above the garden soil so that nutrients supplied from above are collected within said upper portion and are thereby conserved and prevented from running off and having its substantially imperforate lower portion positioned in said garden soil and confining liquids and nutrients about said plant during plant growth.

* * * * *